(12) United States Patent
Kloft et al.

(10) Patent No.: US 10,697,475 B2
(45) Date of Patent: Jun. 30, 2020

(54) SAFETY DEVICE

(71) Applicant: HYDAC TECHNOLOGY GMBH, Sulzbach/Saar (DE)

(72) Inventors: Peter Kloft, Ransbach-Baumbach (DE); Herbert Baltes, Losheim (DE)

(73) Assignee: HYDAC TECHNOLOGY GMBH, Sulzbach/Saar (DE)

(*) Notice: Subject to any disclaimer, the term of this patent is extended or adjusted under 35 U.S.C. 154(b) by 0 days.

(21) Appl. No.: 15/774,675

(22) PCT Filed: Sep. 27, 2016

(86) PCT No.: PCT/EP2016/001605
§ 371 (c)(1),
(2) Date: May 9, 2018

(87) PCT Pub. No.: WO2017/080627
PCT Pub. Date: May 18, 2017

(65) Prior Publication Data
US 2018/0347596 A1    Dec. 6, 2018

(30) Foreign Application Priority Data

Nov. 14, 2015   (DE) .......................... 10 2015 014 797

(51) Int. Cl.
*F16K 17/40*   (2006.01)
*F15B 1/08*    (2006.01)
(Continued)

(52) U.S. Cl.
CPC ............... *F15B 1/083* (2013.01); *F15B 1/24* (2013.01); *F16K 13/06* (2013.01); *F16K 17/162* (2013.01);
(Continued)

(58) Field of Classification Search
CPC ...... F15B 1/083; F15B 1/24; F15B 2201/205; F15B 2201/31; F15B 2201/4155;
(Continued)

(56) References Cited

U.S. PATENT DOCUMENTS 2,365,364 A * 12/1944 Temple ................ A62C 13/003
                                                                    137/68.11
2,441,011 A *  5/1948 Dodelin ................. F16K 13/06
                                                                    137/68.13

(Continued)

FOREIGN PATENT DOCUMENTS

DE        2052621        5/1971
DE   10 2004 015 629    11/2005
(Continued)

OTHER PUBLICATIONS

International Search Report (ISR) dated Dec. 12, 2016 in International (PCT) Application No. PCT/EP2016/001605.

*Primary Examiner* — Minh Q Le
(74) *Attorney, Agent, or Firm* — Wenderoth, Lind & Ponack, L.L.P.

(57) ABSTRACT

A safety device includes a connection point (21) for a pressure accumulator (1) that is connected to a bursting unit (55) at the gas end via the connection point (21). The bursting unit (55) can be triggered by a controllable force element (73). In the triggered state, the bursting unit allows the pressure accumulator (1) to be emptied at the gas end.

10 Claims, 4 Drawing Sheets

(51) Int. Cl.
*F16K 17/16* (2006.01)
*F15B 1/24* (2006.01)

(52) U.S. Cl.
CPC ..... *F15B 2201/205* (2013.01); *F15B 2201/31* (2013.01); *F15B 2201/4155* (2013.01); *F15B 2201/50* (2013.01); *F15B 2201/51* (2013.01)

(58) Field of Classification Search
CPC .. F15B 2201/50; F15B 2201/51; F16K 13/06; F16K 17/162
USPC .............................. 137/68.13, 68.22, 68.3, 73
See application file for complete search history.

(56) References Cited

U.S. PATENT DOCUMENTS

| | | | | |
|---|---|---|---|---|
| 2,478,958 A * | 8/1949 | Wheeler | ............ | F02K 9/38 137/68.13 |
| 2,684,180 A * | 7/1954 | Allen | ............ | F16K 13/04 137/68.23 |
| 2,972,998 A * | 2/1961 | Detwiler | ............ | F16K 13/06 137/68.13 |
| 3,000,542 A | 9/1961 | Longenecker et al. | | |
| 3,129,716 A * | 4/1964 | Harvey | ............ | F16K 13/06 137/68.13 |
| 3,633,596 A * | 1/1972 | Gerber | ............ | F16K 13/04 137/68.3 |
| 3,744,816 A * | 7/1973 | Yamaguchi | ............ | B60R 21/268 137/68.13 |
| 4,006,780 A * | 2/1977 | Zehr | ............ | A62C 35/00 137/72 |
| 4,014,213 A * | 3/1977 | Parquet | ............ | B60T 13/148 138/104 |
| 4,046,156 A * | 9/1977 | Cook | ............ | A62C 13/76 137/68.13 |
| 4,243,856 A * | 1/1981 | Gratzmuller | ............ | F15B 1/08 200/81 R |
| 4,452,275 A * | 6/1984 | Sugimura | ............ | F15B 1/083 137/74 |
| 4,600,123 A * | 7/1986 | Galbraith | ............ | A62B 1/20 102/530 |
| 4,733,872 A * | 3/1988 | Sugimura | ............ | F15B 1/083 138/178 |
| 5,076,312 A * | 12/1991 | Powell | ............ | B60R 21/268 137/68.25 |
| 5,495,865 A * | 3/1996 | Wass | ............ | F16K 17/383 137/68.22 |
| 5,664,804 A * | 9/1997 | Saccone | ............ | B60R 21/264 137/68.13 |
| 5,803,493 A * | 9/1998 | Paxton | ............ | B60R 21/272 280/737 |
| 5,879,025 A * | 3/1999 | Blumenthal | ............ | B60R 21/264 280/737 |
| 6,227,562 B1 * | 5/2001 | Shirk | ............ | B60R 21/268 137/68.13 |
| 6,554,315 B2 * | 4/2003 | Freesmeier | ............ | B60R 21/268 280/730.2 |
| 6,629,703 B2 * | 10/2003 | Horton | ............ | B60R 21/261 137/68.13 |
| 6,769,714 B2 * | 8/2004 | Hosey | ............ | B60R 21/272 280/737 |
| 6,805,376 B2 * | 10/2004 | Mizuno | ............ | B60R 21/268 102/531 |
| 7,914,040 B1 * | 3/2011 | Stevens | ............ | B60R 21/274 137/68.13 |
| 9,689,405 B1 * | 6/2017 | Mizukami | ............ | F15B 1/083 |
| 2004/0050042 A1 | 3/2004 | Frazer | | |
| 2005/0103379 A1 * | 5/2005 | Sundholm | ............ | A62C 13/64 137/68.3 |
| 2005/0205129 A1 * | 9/2005 | Karalis | ............ | F16K 17/1626 137/68.13 |
| 2006/0016074 A1 * | 1/2006 | Baltes | ............ | F15B 1/24 29/890.06 |
| 2006/0137742 A1 | 6/2006 | Smith et al. | | |
| 2009/0000406 A1 | 1/2009 | Brazier et al. | | |
| 2010/0127195 A1 | 5/2010 | McLelland et al. | | |
| 2010/0206390 A1 * | 8/2010 | Hollars | ............ | F16K 17/383 137/68.3 |
| 2013/0082054 A1 | 4/2013 | Groben | | |
| 2013/0291952 A1 * | 11/2013 | Zhou | ............ | F17D 5/02 137/15.11 |

FOREIGN PATENT DOCUMENTS

| | | | |
|---|---|---|---|
| DE | 10 2004 015 629 A1 * | 11/2005 | ............ F15B 15/10 |
| DE | 10 2008 062 836 | 8/2010 | |
| DE | 10 2013 211 344 | 12/2014 | |
| EP | 0 021 895 | 1/1981 | |
| EP | 2 792 931 | 10/2014 | |
| WO | 02/46621 | 6/2002 | |
| WO | 2005/088178 | 9/2005 | |

\* cited by examiner

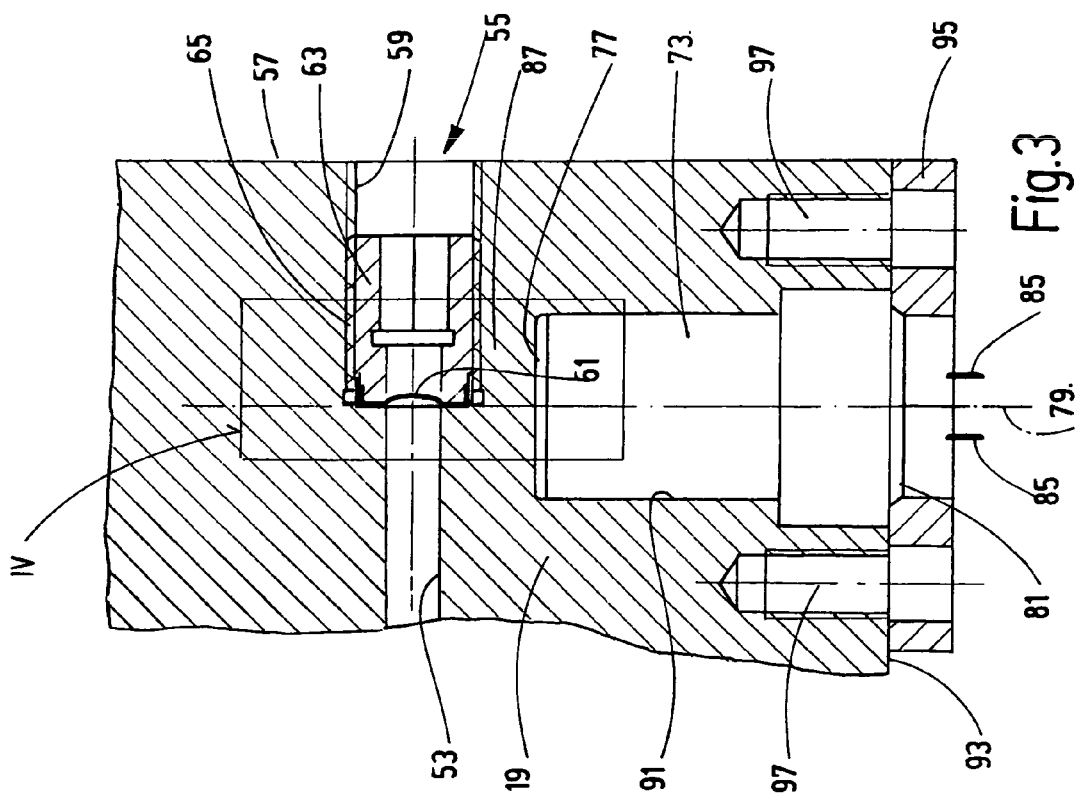
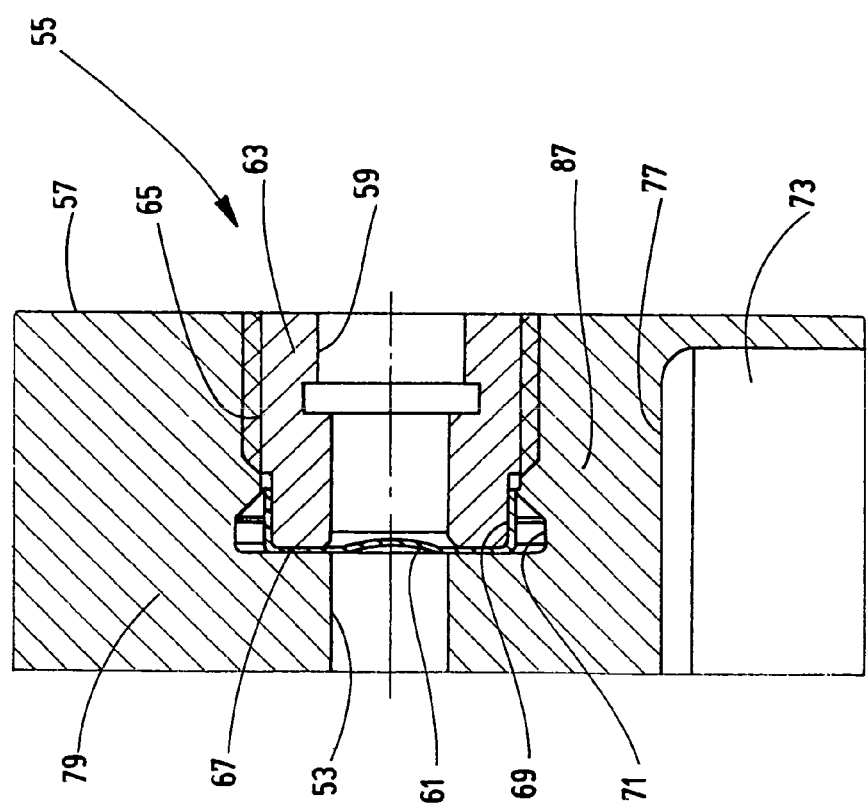
Fig.3
Fig.4

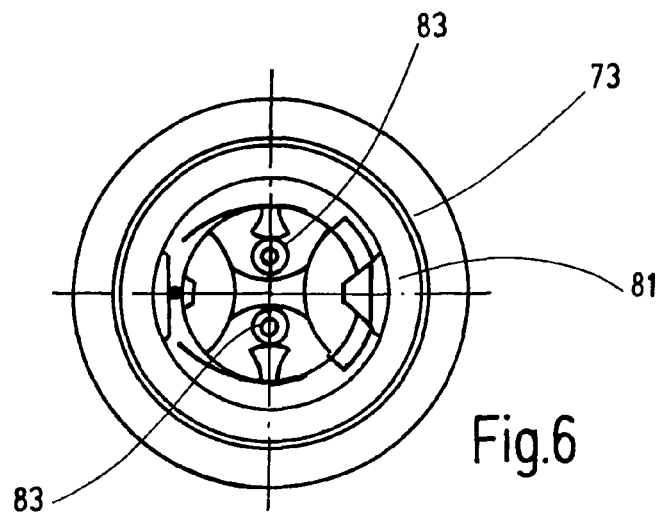
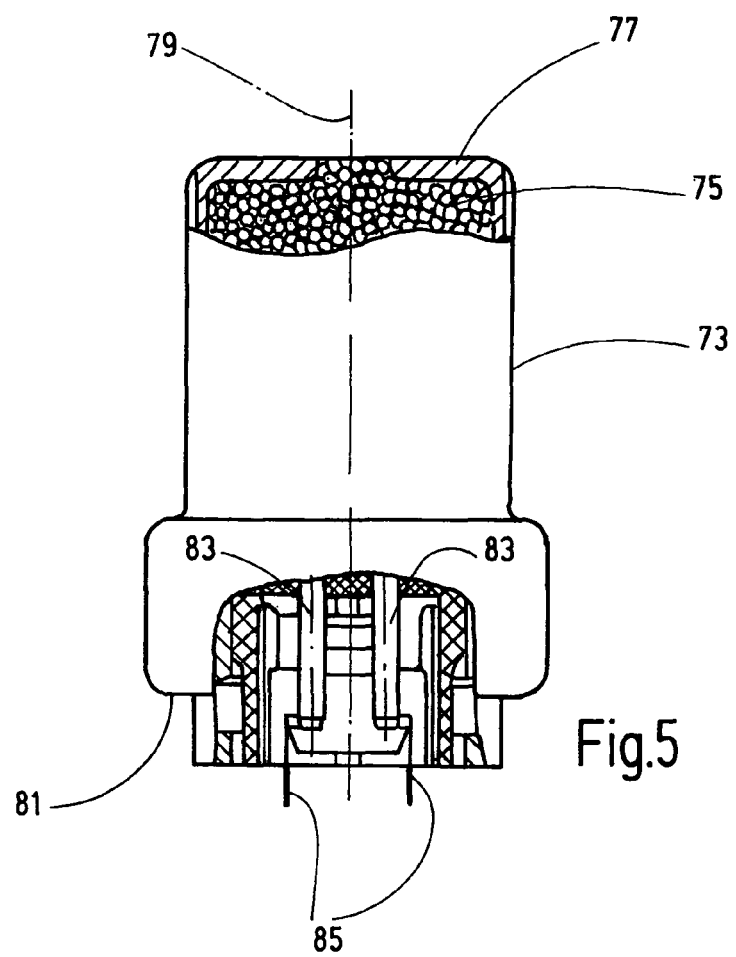

SAFETY DEVICE

FIELD OF THE INVENTION

The invention relates to a safety device comprising a connection point for a pressure accumulator that is connected to a bursting device at the gas side via the connection point.

BACKGROUND OF THE INVENTION

Such safety devices are state of the art. In systems, in which gaseous working media are used, safety devices of this type are employed to obtain a safe, i.e. not environmentally hazardous pressure reduction in the event of a problem. In particular in the case of systems that contain pressure accumulators, which during operation produce high gas pressures that can be 100 bar or higher, it is necessary to ensure that, when there are pressure increases exceeding a safe limit value, of the kind produced by operation interruptions due to malfunction of system components or due to temperature increases, for example in the case of a fire, a safe pressure reduction takes place through activation of the bursting device.

SUMMARY OF THE INVENTION

Given this prior art, the problem addressed by the invention is to provide an improved safety device that ensures a particularly safe activation of the bursting device assigned to a pressure accumulator.

According to the invention, this problem is basically solved by a safety device having a bursting device that can be triggered by an actuatable force element, by contrast with the prior art where the bursting device is activated simply when an excess pressure exceeding a given value is reached. A triggering then can occur in the case of a problem or in a hazardous situation without excess pressure prevailing or even before the excess pressure is reached. This arrangement allows the bursting device to react to hazardous situations, for example in the case of a fire, with a pressure reduction before a dangerous excess pressure is reached due to heating in the case of a fire. The invention is then particularly advantageously suitable for applications in mobile systems in which pressure accumulators are present, such as in vehicles which are provided with an energy recovery device in conjunction with a hydrostatic travel drive. Such systems comprise at least one pressure accumulator that can be charged to a high pressure level for storage of braking energy. In this regard DE 10 2008 062 836 B3, for example, presents such a drive system for utility vehicles or other vehicles that can be deployed on roads. The safety device according to the invention used in such vehicles permits a non-hazardous, preventive pressure reduction in the case of problems, for example, a vehicle crash or the like.

In advantageous exemplary embodiments, the bursting device has a bursting disk that is triggered when a maximum gas-side pressure is exceeded and/or when the force element is actuated. Because the breakage of the bursting disk makes the pressure reduction take place in the case of excess pressure even without activation of the force element, the invention satisfies particularly high safety requirements.

A pyrotechnic object can particularly advantageously be provided as the force element that, when the propellant is ignited, deforms or destroys a wall section of a housing in such a way that the bursting device accommodated therein is triggered, or that destroys the bursting disk of the bursting device by an activation pin. In the former case the shock wave released by ignition of the propellant itself leads to the destruction of the bursting disk. In the latter case the breakage of the bursting disk takes place by the mechanical action of a mechanical part moved by the explosion pressure of the ignited propellant.

The actuation of the force element can be coupled to a sensor system, in particular to the sensor system of an airbag. The airbag also activates the force element when the airbag is triggered. This arrangement has the advantage that for the detection of an accident, which calls for a safe pressure discharge, there is no need for the force element to have its own sensor system.

The arrangement can advantageously be such that the bursting disk of the bursting device is fixed in a pressure-conveying channel in the housing and seals this channel in a pressure-tight manner. That channel leads to the gas side of the pressure accumulator and opens into the environment. By pressure from the bursting disk, a direct connection is then formed between the gas side of the pressure accumulator and the environment.

The bursting disk can particularly advantageously lie inside the channel in the same plane as the direction of action of the pyrotechnic force element. A wall section of the housing can be destroyed or deformed by the propellant extending transverse to this plane.

In particularly advantageous exemplary embodiments, the force element carries, encapsulated on its front face side, the pyrotechnic propellant to be electrically ignited. The encapsulated propellant is connected to the wall section, on which the bursting device is at least partially laid. In this arrangement, the wall section is directly exposed to the pressure shock wave produced by the propellant.

In a particularly advantageous manner, the housing can also form the support for functional elements belonging to a corresponding pressure accumulator to be rendered safe, such as a pressure sensor, a temperature sensor, a safety fuse device, a filling connection for pressurized gas and/or a test connection for a testing device. A safety fuse device, which realizes a temperature-dependent pressure release even without activation of the force element, provides an additional safety feature.

In advantageous exemplary embodiments, all of the functional elements used in the housing, including the bursting device, are connected to a common channel system, which is connected in a pressure-conveying manner to the gas side of the pressure accumulator. The overall assembly can then be realized in the form of a compact unit.

The pressure accumulator to be rendered safe can be a piston accumulator, which is part of an energy recovery system in a motor vehicle and which, on its accumulator housing side with the pressurized gas, carries the block-shaped housing with its own functional elements.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 3 is a slightly enlarged by comparison with a practical embodiment, partial top view in section of the housing of the safety device according to the exemplary embodiment of the invention;

FIG. 4 is an enlarged by a factor of 2 compared with FIG. 3, partial top view in section of the region identified in FIG. 3 with IV;

FIG. 5 is an enlarged by a factor of 1.5 compared with a practical embodiment and partially in section of a side view of an exemplary embodiment of a pyrotechnic force element for use in the safety device according to the invention; and FIG. 6 is, on the scale of FIG. 5 and rotated 90° relative thereto, a bottom end view of the pyrotechnic force element of FIG. 5.

DETAILED DESCRIPTION OF THE INVENTION

Figure 1:
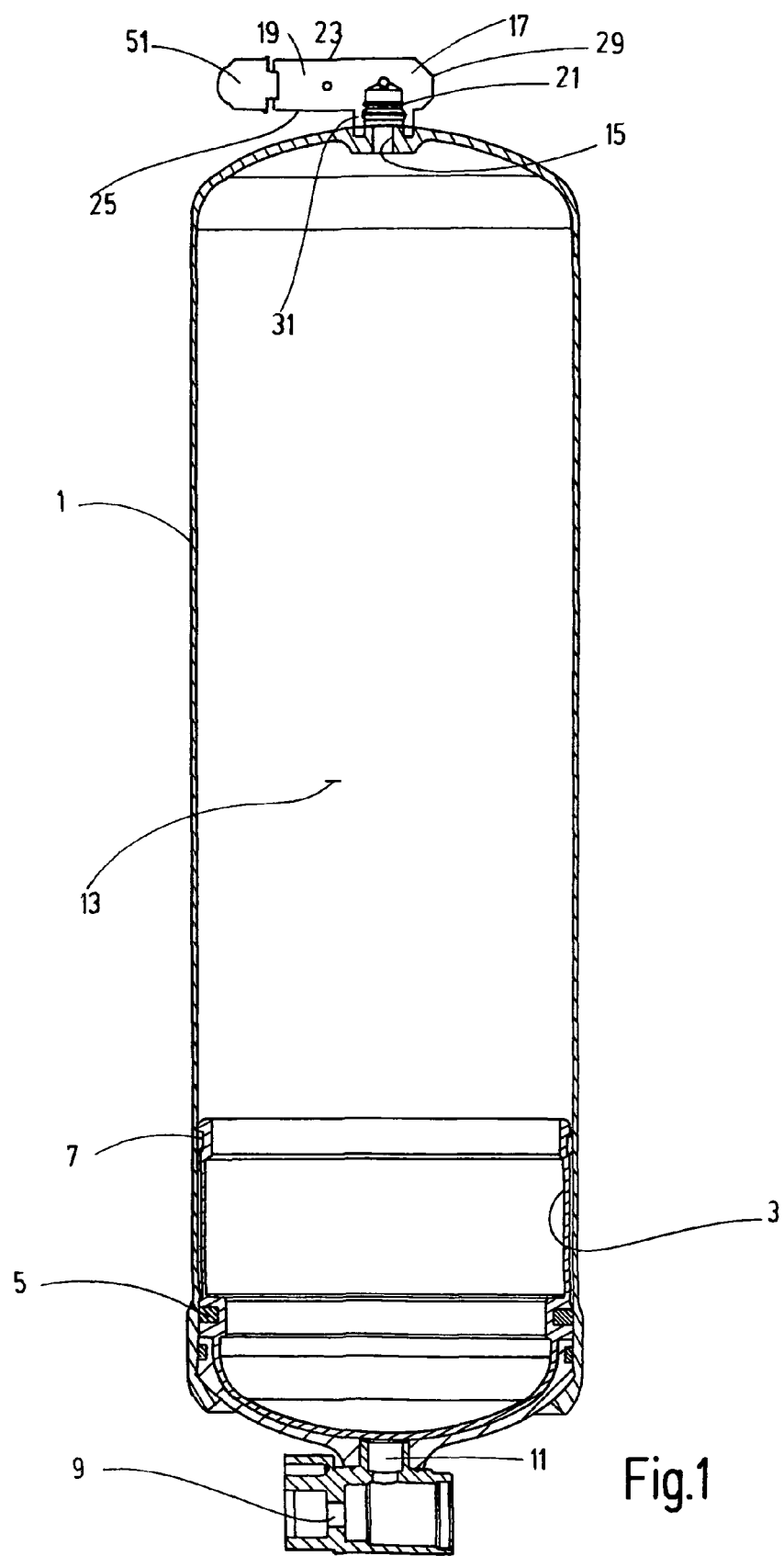
FIG. 1 is a side view in section of a pressure accumulator provided at the gas side with a safety device according to an exemplary embodiment of the invention depicted in a schematically simplified manner.

FIG. 1 shows a hydropneumatic pressure accumulator 1, which can be used for example in vehicles with a hydrostatic drive that are provided with an energy recovery device in order to store braking energy, as disclosed in DE 10 2008 062 836 B3. The pressure accumulator 1 depicted in FIG. 1 is a piston accumulator. The accumulator piston 3 is standard for such accumulators and is provided with at least one piston seal 5 and at least one piston guide 7 to be guided in a mobile manner inside the pressure accumulator 1. In FIG. 1, the piston 3 is depicted in a position in which the oil side 11 connected to a hydraulic connection 9 is unpressurized, so that the piston 3 is located in the end position, in which the volume of the gas side 13 has the maximum value. At the end of the pressure accumulator 1 opposite the oil side 11 there is a gas connection 15, by which the gas side 13 can be filled with a working gas, such as nitrogen. In an application for storage of braking energy in the case of energy recovery devices high gas pressure can occur during operation at the gas side 13, so that safety measures must be undertaken, which bring about a safe pressure reduction in the case of problems or a hazardous situation. The state of the art is to provide a safety device 17 at the gas connection 15 that produces a safe pressure reduction by activation of a bursting device.

Figure 2:
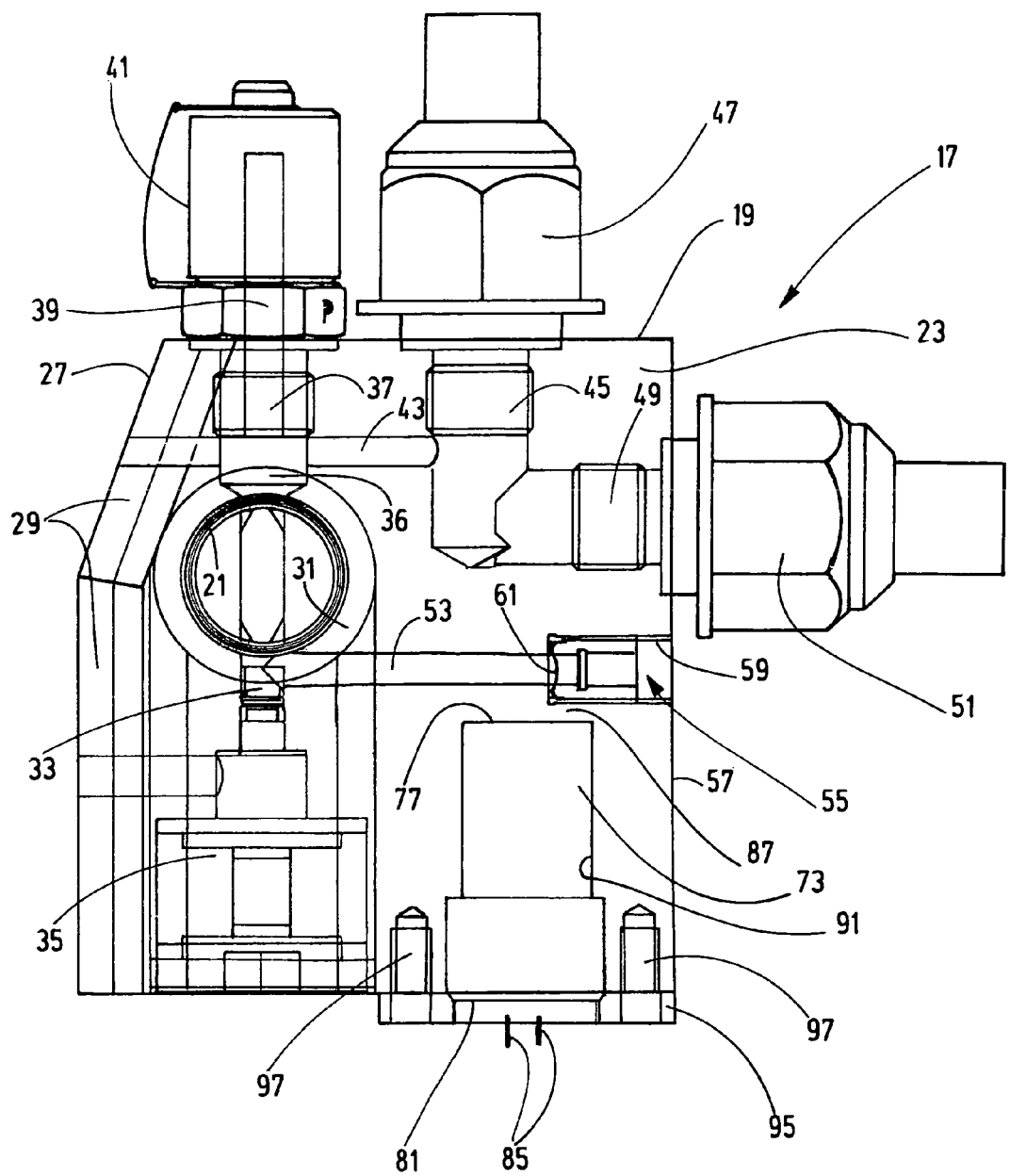
FIG. 2 is a top view of the exemplary embodiment of the safety device, with the top cover wall of the housing being depicted transparent.

FIGS. 2 to 4 show further details of the housing 19 of the safety device 17 according to the invention. The housing 19 has the form of a housing block with a planar top side 23 and a bottom side 25 extending in a plane parallel thereto, cf. FIG. 1. As FIG. 3 shows, the block is rectangular apart from a chamfered edge region 27. In this figure the top side 23 of the block is depicted transparent, so that inner channels, connections assigned thereto and assigned functional elements are visible in FIG. 2. This figure also shows, in the vicinity of the long side provided with a chamfer 29, a connection piece 31 projecting from the bottom side 25 (FIG. 1). The thread of the screw connection 21 is formed for the connection to the gas connection 15. Branching off the thus formed pressure connection is a first channel 33, which leads to a safety fuse 35 of conventional construction. On the side of connection piece 31 opposite the channel 33 a second channel 36 branches off the pressure connection, which second channel 36 leads to a filling connection 37, at which a filling valve 39 of conventional construction is arranged with a cover cap 41 located on the outside of the housing. A third channel 43 branches off the second channel 36 at a right angle. This third channel 43 leads to a connection 45 for a pressure sensor 47 located on the outside of the housing and to a connection 49 for a temperature sensor 51 located on the outside of the housing.

At the point of the branch of the first channel 33 from the pressure connection an additional fourth channel 53 extending parallel to the third channel 43 branches off, which fourth channel 53 forms the connection of the bursting device 55 according to the invention to the pressure connection. FIGS. 3 to 6 show further details of the bursting device 55 and of the functional elements provided according to the invention for the controlled triggering of the bursting device 55. As FIG. 3 and in particular the enlarged depiction of FIG. 4 show, the channel 53 is separated from the outlet 59 opening at the housing side 57 by a bursting disk 61. This bursting disk is, as FIG. 4 most clearly shows, fixed by a threaded insert 63, which is screwed from the housing side 57 into a threaded hole 65 of the housing 19. The insert 63 clamps the bursting disk 61 against a shoulder 67 formed on the inner end of the threaded hole 65, with the peripheral edge 69 of the bursting disk 61 inside an annular groove 71 located at the end of the threaded hole 65 being laid or extending around the end of the insert 63.

For the triggering of the bursting disk 61 of the bursting device 55 by an actuatable force element, the present exemplary embodiment provides a pyrotechnic device having a cartridge 73, which contains an electrically ignitable propellant 75. This propellant is encapsulated in the cartridge 73 in such a way that, when the propellant 75 is ignited, an explosion pressure wave is discharged starting from the top side of the cartridge 77 with a direction of action along the cartridge longitudinal axis 79. For the electric ignition the cartridge 73 has, at the end 81 opposite the top side 77, contact pins 83 with connecting lugs 85 for ignition lines. As FIG. 3 most clearly shows, the cartridge 73 is fixed in a housing hole 91, which starts from the housing side 93, by a retaining ring 95, which is attached by screws 97 onto the housing 19.

As FIGS. 3 and 4 show, the top side 77 of the cartridge 73 with the discharge region of the explosion pressure wave is located on a wall section 87 of the housing 19, which wall section 87 directly adjoins the bursting device 55. The direction of action of the explosion pressure wave extends along the axis 79 extending in the plane of the bursting disk 61. The resulting deformation of the wall section 87, in particular in the region of the shoulder 67 clamping the bursting disk 61, leads to the destruction of the closure of the channel 53 by the bursting disk 61 and then to the pressure reduction that takes place via the channel 53 in the direction of the free environment of the block. Independently of a triggering of the bursting disk 61 by built up excess pressure and independently of a pressure reduction brought about by excess temperature by activation of the safety fuse 35, the invention permits controlled triggering of the bursting device 55 based on different signaling when a problem or a hazardous situation occurs. Without additional sensors, this arrangement allows use of the triggering signal of an airbag in the event of a crash.

While the depicted exemplary embodiment uses the direct action of the explosion pressure wave of a pyrotechnic cartridge 73 to trigger the bursting device 55, the breakage of the bursting disk 61 can be brought about by mechanical action of a mechanical force element. For example, instead of a pyrotechnic device generating an explosion pressure wave, a pyrotechnic element can be provided that, when ignited, provides the drive for a mobile pin (not depicted), which pin destroys the bursting disk by mechanical action. At the same time, with the depicted direct use of the explosion pressure wave, the safety device can be realized with a simple construction at little expense.

While one embodiment has been chosen to illustrate the invention, it will be understood by those skilled in the art that various changes and modifications can be made therein without departing from the scope of the invention as defined in the claims.

The invention claimed is:

1. A safety device comprising:
   a pressure accumulator having a gas side and a fluid side separated by a separator member inside an accumulator housing;
   a gas connection point extending through said accumulator housing and being in fluid communication with said gas side; and
   a bursting device connected to said gas connection point and triggerable by an activatable force element permitting release of gas pressure in said gas side when triggered, said bursting device having a bursting disk triggerable when a maximum pressure is exceeded in said gas side and when ignition of a pyrotechnic propellant generates a force deforming or destroying a wall section of a safety housing device such that the bursting device is triggered or destroys said bursting disk, said bursting disk being fixed in a pressure-conveying channel in said safety housing sealing said pressure-conveying channel pressure-tight between a fluid communication connection of said pressure-conveying channel with said gas side and an end of said pressure-conveying channel opening on an environment surrounding said pressure accumulator, said bursting disk lying in a plane containing a direction of the force generated by ignition of said pyrotechnic propellant, said wall section extending transverse to said plane, said pyrotechnic propellant being connected to a vehicle airbag system that is capable of triggering said pyrotechnic propellant.

2. A safety device according to claim 1 wherein
   said pyrotechnic propellant is encapsulated in a propellant housing having a front side connected to said wall section and is electrically ignitable.

3. A safety device according to claim 1 wherein
   said safety housing comprises functional elements of at least one of a pressure sensor, temperature sensor, safety fuse, a filling connection or a testing connection.

4. A safety device comprising:
   a pressure accumulator having a gas side and a fluid side separated by a separator member inside an accumulator housing;
   a gas connection point extending through said accumulator housing and being in fluid communication with said gas side; and
   a bursting device connected to said gas connection point and triggerable by an activatable force element permitting release of gas pressure in said gas side when triggered, said bursting device having a bursting disk triggerable when a maximum pressure is exceeded in said gas side and when ignition of a pyrotechnic propellant generates a force deforming or destroying a wall section of a safety housing device such that the bursting device is triggered or destroys said bursting disk, said bursting disk being fixed in a pressure-conveying channel in said safety housing sealing said pressure-conveying channel pressure-tight between a fluid communication connection of said pressure-conveying channel with said gas side and an end of said pressure-conveying channel opening on an environment surrounding said pressure accumulator, said bursting disk lying in a plane containing a direction of the force generated by ignition of said pyrotechnic propellant, said wall section extending transverse to said plane, said safety housing including functional elements of at least one of a pressure sensor, temperature sensor, safety fuse, a filling connection or a testing connection, said functional elements and said bursting device being connected to a common set of pressure-conveying channels in fluid communication with said gas side.

5. A safety device according to claim 4 wherein
   said pyrotechnic propellant is connected to a vehicle airbag system that is capable of triggering said pyrotechnic propellant.

6. A safety device comprising:
   a pressure accumulator having a gas side and a fluid side separated by a separator member inside an accumulator housing, said separator member being an accumulator piston and forming a part of an energy recovery system in a motor vehicle;
   a gas connection point extending through said accumulator housing and being in fluid communication with said gas side; and
   a bursting device connected to said gas connection point and triggerable by an activatable force element permitting release of gas pressure in said gas side when triggered, said bursting device having a bursting disk triggerable when a maximum pressure is exceeded in said gas side and when ignition of a pyrotechnic propellant generates a force deforming or destroying a wall section of a safety housing device such that the bursting device is triggered or destroys said bursting disk, said bursting disk being fixed in a pressure-conveying channel in said safety housing sealing said pressure-conveying channel pressure-tight between a fluid communication connection of said pressure-conveying channel with said gas side and an end of said pressure-conveying channel opening on an environment surrounding said pressure accumulator, said bursting disk lying in a plane containing a direction of the force generated by ignition of said pyrotechnic propellant, said wall section extending transverse to said plane.

7. A safety device comprising:
   a pressure accumulator having an accumulator housing with a gas side and a fluid side separated by a separator member inside said accumulator housing;
   a gas connection point in said accumulator housing in fluid communication with said gas side;
   a bursting device connected to said gas connection point and in fluid communication with said gas side via said gas connection point, said bursting device being triggerable by an activating force to permit release of gas pressure in said gas side in a direction of a free environment outside of a safety housing of said bursting device, said safety housing having a functional element of a pressure sensor, a temperature sensor, a safety fuse or a testing device and having a filling connection for pressurized gas in fluid communication with said gas side, said bursting device including a pyrotechnic propellant triggerable to open a seal providing direct fluid communication between said gas side and said free environment surrounding said safety housing, said pyrotechnic propellant is connected to a vehicle airbag system that is capable of triggering said pyrotechnic propellant, said pyrotechnic propellant is connected to a vehicle airbag system that is capable of triggering said pyrotechnic propellant; and a common system of pressure-conveying channels in said safety housing connecting said bursting device and said function element to said gas side.

8. A safety device according to claim 7 wherein
said pyrotechnic propellant is encapsulated in a propellant housing having a front side connected to a wall section said safety housing and is electrically ignitable.

9. A safety device comprising:

a pressure accumulator having an accumulator housing with a gas side and a fluid side separated by a separator member inside said accumulator housing, said separator member being an accumulator piston and forms a part of an energy recovery system in a motor vehicle;

a gas connection point in said accumulator housing in fluid communication with said gas side;

a bursting device connected to said gas connection point and in fluid communication with said gas side via said gas connection point, said bursting device being triggerable by an activating force to permit release of gas pressure in said gas side in a direction of a free environment outside of a safety housing of said bursting device, said safety housing having a functional element of a pressure sensor, a temperature sensor, a safety fuse or a testing device and having a filling connection for pressurized gas in fluid communication with said gas side, said bursting device including a pyrotechnic propellant triggerable to open a seal providing direct fluid communication between said gas side and said free environment surrounding said safety housing; and a common system of pressure-conveying channels in said safety housing connecting said bursting device and said function element to said gas side.

10. A safety device according to claim 9 wherein
said pyrotechnic propellant is connected to a vehicle airbag system that is capable of triggering said pyrotechnic propellant.

* * * * *